Patented May 6, 1924.

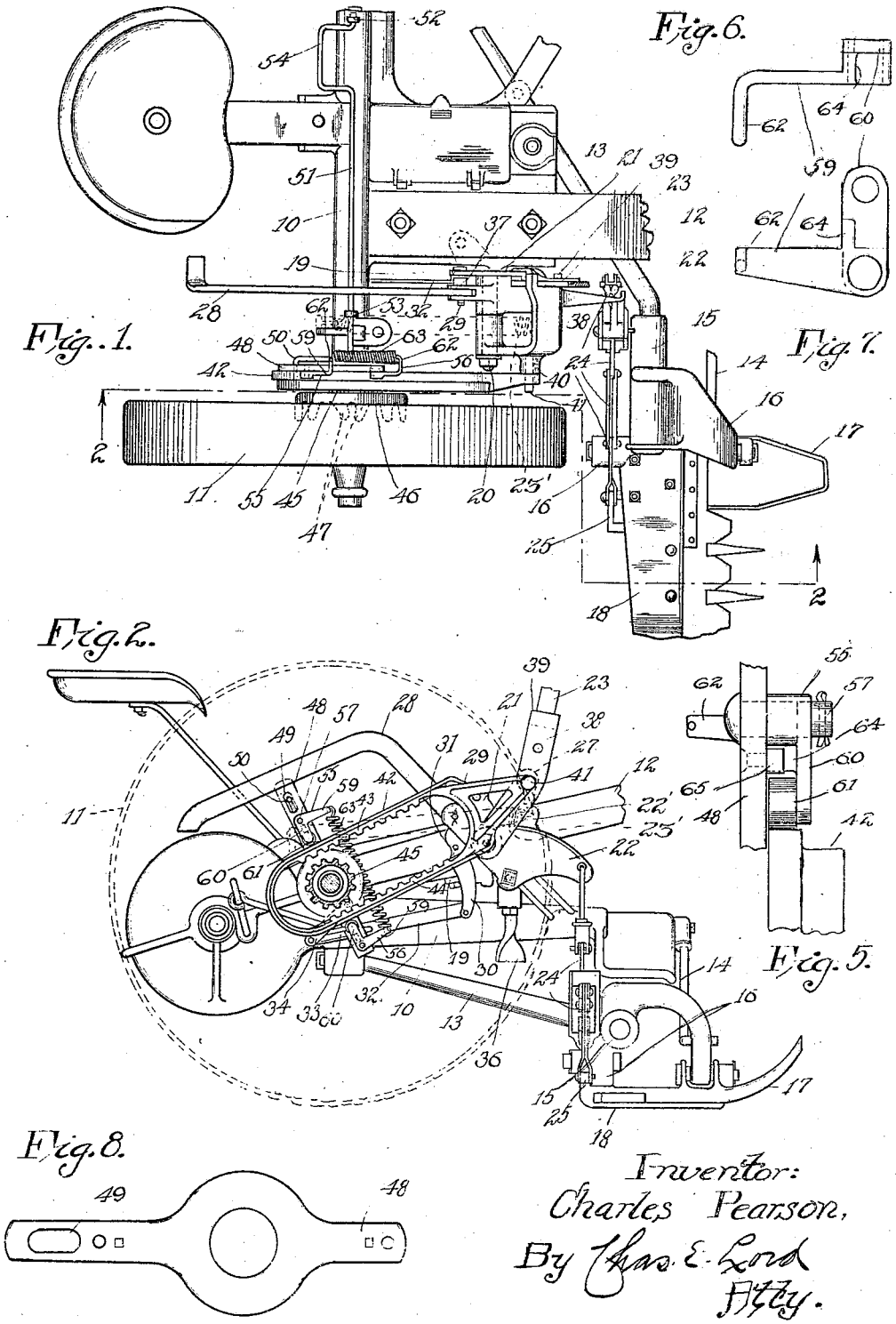

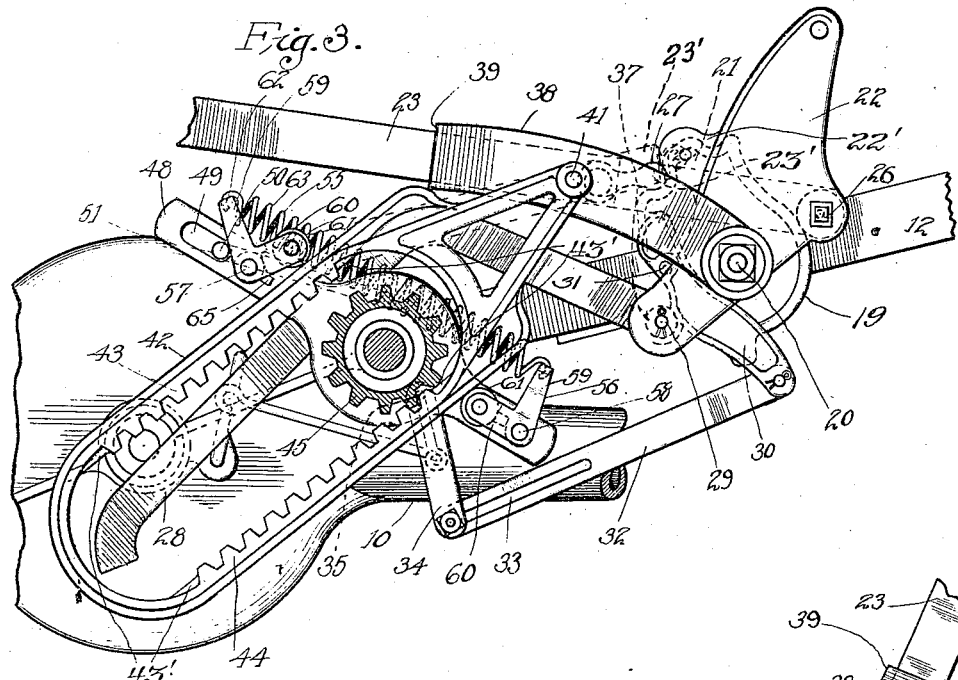

1,493,274

UNITED STATES PATENT OFFICE.

CHARLES PEARSON, OF CHICAGO, ILLINOIS, ASSIGNOR TO INTERNATIONAL HARVESTER COMPANY, A CORPORATION OF NEW JERSEY.

MOWING MACHINE.

Application filed August 13, 1919. Serial No. 317,246.

*To all whom it may concern:*

Be it known that I, CHARLES PEARSON, a citizen of the United States, residing at Chicago, in the county of Cook and State of Illinois, have invented certain new and useful Improvements in Mowing Machines, of which the following is a full, clear, and exact specification.

My invention relates to improvements in mowing machines, and more particularly to the mechanism for raising and lowering the cutter bar in an improved manner.

One of the objects of this invention is to provide a device which will raise or lower the cutter bar by power.

A further object is to employ the forward or rearward movement of the machine to raise or lower the cutter bar from cutting position to inoperative or to vertical position.

A further object is to provide a device which will lock the cutter bar in intermediate positions and from this position be either raised or lowered by either a forward or rearward movement of the machine.

A further object is to provide a means for automatically disconnecting the power from the adjusting mechanism of the cutter bar when predetermined positions have been reached.

I attain these objects by providing an improved means for transmitting the power from the traction wheel of the mower to the lifting mechanism of the cutter bar. More specifically stated, the invention in the present instance comprises a main driving member suitably connected to the traction wheels, and a reversible power transmitting mechanism, such for instance, as rack and pinion mechanism for transmitting the power from the main driving member to the mower lifting mechanism.

The invention consists in general of certain novel details of construction and combination of parts hereinafter fully described, illustrated in the accompanying drawings and specifically claimed.

In the accompanying drawings, like characters of reference indicate like parts throughout the several views, and Fig. 1 is a top plan view of a part of a mower embodying my invention;

Fig. 2 is a vertical sectional view taken on the line 2—2 in Fig. 1, looking in the direction of the arrows;

Fig. 3 is an enlarged detail view showing the position of certain parts when the cutter bar is raised to a vertical position;

Fig. 4 is an enlarged detail view of the same parts shown in Fig. 3 when the cutter bar is in a horizontal position;

Fig. 5 is an enlarged detail view showing the mounting of the roller crank members;

Figs. 6 and 7 are enlarged plan view and side elevation showing the construction of the roller crank members; and Fig. 8 is an enlarged detail view of the oscillating support for the roller crank members.

The mowing machine shown comprises, when broadly considered, a wheeled frame 10 mounted on the carrying wheels 11, having a draft tongue 12 (only part of which is shown), a coupling bar 13, a supplemental coupling member 14, a rocking coupling yoke 15 carried by the grassward end of the main coupling bar and having depending arms 16 whereby it is pivotally connected to the shoe 17 and a finger bar 18 secured to said shoe. The frame 10 has securely fixed adjacent one side of the tongue a bracket member 19 having a laterally projecting bearing member 20 and a toothed sector 21 formed integrally with said bracket. Pivotally mounted on the bearing 20 is a lifting arm 22 which has a lever 23 secured thereto by means of a bolt 26. The lever 23 is further provided with a freely rotatable gravity pawl 27, the free end of which is adapted to engage with the toothed sector 21. The lifting arm 22 has pivoted on its rear end a foot lever 28 by means of a pin 29 in a manner permitting the lever to have a limited swinging movement upward relative to the arm 22. The lifting arm 22 is connected to the cutter bar 18 in the usual manner by means of the common form of links 24 and lever extension 25 formed integrally with the shoe 17. For a more detailed description of the above mechanism, see my Patent Number 1,237,689, August 21, 1917. The mower here shown is provided with the usual counterbalancing spring 23' (shown in dotted lines) connected at its rear end to the frame 10 and at its front end to the ear 22' formed integrally on the arm 22. Pivotally mounted on the bracket 19 is a cam shaft lever 30 adapted to swing in a vertical plane about the pivot 31, the free end of said lever being pivotally connected to a link 32, the rear end of said link being provided with a longitudinally disposed slot 33 whereby said link is slidably connected with an arm 34 secured to the clutch tripping rock shaft 35, the shaft 35 being operatively connected with the clutch mechanism (enclosed in the frame 10) in any preferred manner. For a more complete description of this machine see my patent above mentioned. A depending stop member 36 is adjustably secured to the main frame of the machine and is adapted to contact the coupling bar 13 when said bar has been raised a predetermined height. The pin 29 is provided with a roller 37, and when the lever 23 is moved rearwardly from the position shown in Fig. 4 to the position shown in Fig. 3 the roller engages with the cam lever 30 in a manner to swing it about its axis in a direction to disengage the clutch mechanism when the lever 23 has reached a predetermined limit of its rearward movement in raising the finger bar, but when the lever 23 is moved forward to permit the finger bar to swing outward and downward to an operative position, the roller 37 on the pin 29 will engage the cam lever 30 above its axis and swing said lever in a direction to permit the clutch mechanism to become operative as a driving element transmitting motion to the cutting apparatus when the finger bar has reached a predetermined angle of inclination in a downward direction.

The specific mechanism which forms a part of the present invention will next be described.

Rotatably mounted on the bearing 20 of the bracket 19 and which pivotally carries the lever 23 is a yoke member 38, the free end of which is provided with a bifurcated portion 39 for the reception of the lever 23 for retaining said lever in a fixed relation with respect to said yoke. Laterally extending from the yoke member 38 and formed integrally therewith is a boss portion 40. Pivotally secured to said boss by means of a pin 41 is a double rack member 42, having oppositely disposed teeth 43 and 44. The rack member 42 is movable in a vertical plane and engageable with a driving gear 45 loosely mounted on the frame 10 and formed integrally with a disk-like driving member 46 which has laterally projecting lugs 47 for engaging the spokes of one of the carrying wheels 11.

In connection with my invention, I have provided means for automatically disengaging the gear 45 from the teeth of the rack 42 when the cutter bar 18 has reached a vertical or horizontal position. This means includes a rib 43' formed as an integral part of the first and last teeth in the rack 43 and 44. This rib 43' engages the teeth on the gear 45 and forces the rack 42 out of engagement with said gear, thus permitting said gear to rotate freely. It is to be further noted that with the rack and gear construction, the tension of the balancing spring 23' may be overcome so that the whole weight of the cutter bar may be utilized in maintaining said bar in close contact with the ground when in operation. In other words, if the operator continues to depress the foot treadle 54 forwardly in a manner to force the teeth 43 of the rack 42 into engagement with the gear 45, as shown in Fig. 4, the rack 42 through the connections to the yoke 38 will force the lifting arm 22 downwardly and thus overcome the tension of the spring 23' and therefore permit the entire weight of the cutter bar to be utilized in maintaining the bar in close contact with the ground.

Loosely mounted on the frame 10, adjacent the rack member 42 is a crank arm support member 48 provided with a slotted portion 49 which slidably receives a crank end 50 of an oscillatory shaft 51 which is journaled in the bearings 52 and 53 fixed to the frame 10. The shaft 51 is provided on the end opposite the crank 50 with an offset portion or foot treadle 54 conveniently located to the operator's seat. As this foot treadle 54 is oscillated by the operator, the support member 48 is also oscillated about its pivot on the frame 10 by means of the crank 50. The support member 48 is further provided with two oppositely disposed roller crank members 55 and 56 pivoted at 57 and 58 to the upper and lower ends, respectively, of the support member 48. It is obvious from the construction here shown that a remote control may be provided by a suitable connection to the support member 48. The roller crank members 55 and 56 have two diverging extensions 59 and 60. The extension 60 has journaled thereon a roller 61 which is adapted to engage and guide the rack member 42. The extensions 59 of the roller crank members 55 and 56 have laterally extending projections 62 which are connected by a spring 63 in a manner to yieldingly retain stop portions 64 formed integrally on the roller crank members 55 and 56 against lugs 65 secured to supporting member 48 in any desired manner (see Fig. 4). In this figure it can be seen that the roller crank members 55 and 56 are yieldingly rotatable in a direction away from the stop portions 65 and normally retain the rack in a neutral or disengaged position from the gear wheel or driving member 45.

A brief description of the operation of the above described construction will now be given.

When the operator desires to raise the cutter bar from the normal cutting position, while the mower is moving forward, the foot treadle 54 is swung rearwardly, oscillating the shaft 51 and the crank 50 which in turn swings the roller arm support 48 about its pivot to the position shown in Fig. 3. This causes the upper roller crank member 55 to turn about its pivot 57 against the tension of the spring 63, while the lower roller crank member 56 is locked against the lower stop 65 on the support 48; thus swinging the rack 42 upwardly about its pivot and forcing the teeth 44 into engagement with the gear wheel 45, thereby moving the rack 42 rearwardly, carrying with it the yoke 38, lever 23 and raising the cutter bar. It will be seen that the cutter bar is automatically locked in intermediate or vertical positions against downward movement by means of the gravity lock 27 and is automatically unlocked when the lever 23 is moved forwardly by means of power connections to a position freeing the gravity lock from the toothed sector 21. In the operation of this automatic locking device, the pawl 27 which is pivoted to the lever 23 engages the toothed sector 21 when the lever is moved rearwardly to raise the cutting mechanism; but when the lever 23 is moved forwardly by the power rack 43 through the yoke 38 to lower the cutting apparatus, the pawl 27 will turn about its pivot and be released from the toothed sector 21. For a more detailed description of the above described mechanism, see my Patent No. 1,237,689 dated August 21, 1917. If the operator desires to lower the bar from a raised position, while the mower is moving forward, the foot treadle 54 is pressed forwardly and through the same connections, as above described, the roller arm support 48 is swung downwardly about its pivot to a position shown in Fig. 4, whereupon the lower roller member 56 yields and the upper roller crank member 55 is locked against its stop 65 on the supporting member 48, thus forcing the upper teeth 43 of the rack 42 into engagement with the gear wheel 45, thereby moving the rack 42 forwardly and lowering the cutter bar to operative position.

While I have only described the raising and lowering of the cutter bar from the power transmitted by reason of the mower moving forwardly, it is to be understood that the rearward movement of the mower can accomplish the same results, only in a reverse direction; that is to say, the teeth in the rack 42 employed to raise the cutter bar in the forward movement of the mower are employed to lower the cutter bar in the rearward movement of the mower. If for any reason the cutter bar becomes clogged, the operator can raise the bar by swinging the foot treadle 54 forwardly and moving the mower rearwardly, and when cleared of the obstruction return to the original or identical cutting position by moving the mower forwardly and maintaining the foot treadle in a forwardly depressed position. It is also to be noted with the construction here shown and described that the manually operated lifting mechanism and the power operated lifting mechanism are combined in this machine and that either may be used by the operator.

In this application I have shown and described but one embodiment of my invention, but it is to be understood that the invention is capable of modification. Modifications, therefore, in the construction and arrangement of parts may be made without departing from the spirit and scope of the invention, as expressed in the following claims.

1. A mower including, in combination, a frame, a cutting mechanism pivotally connected to said frame, adjusting mechanism for said cutting mechanism, and reversible power actuated means for effecting a reversible adjustment of said adjusting mechanism.

2. A mower including, in combination, a frame, a cutting mechanism pivotally connected to said frame, adjusting mechanism for said cutting mechanism, reversible power actuated means for effecting a reversible adjustment of said adjusting mechanism and manually controlled means for connecting said power actuated means with said adjusting mechanism.

3. A mower including, in combination, a frame, cutting mechanism pivotally connected to said frame, adjusting mechanism for said cutting mechanism, actuating means for said adjusting mechanism, means for automatically locking and unlocking said cutting mechanism in a plurality of positions of adjustment and power actuated means for unlocking said cutting mechanism.

4. A mower including, in combination, cutting mechanism, adjusting mechanism for said cutting mechanism, actuating power means for said adjusting mechanism, and means movable in a forwardly or rearwardly direction for connecting said power actuating mechanism to said adjusting mechanism.

5. A mower including, in combination, cutting mechanism, adjusting mechanism for said cutting mechanism, power actuating means for said adjusting mechanism and reversibly movable manually controlled means for connecting said power actuating mechanism to said adjusting mechanism.

6. A mower including, in combination, a frame, cutting mechanism pivotally connected to said frame, adjusting mechanism for said cutting mechanism, and power actuated means for raising said cutting mechanism by either a forward or rearward movement of said mower.

7. A mower including, in combination, a frame, cutting mechanism pivotally connected to said frame, adjusting mechanism for said cutting mechanism, and power actuated means for lowering said cutting mechanism by either a forward or rearward movement of said mower.

8. A mower including, in combination, a frame, cutting mechanism pivotally connected to said frame, adjusting mechanism for said cutting mechanism and power actuated means for raising and lowering said cutting mechanism by either a forward or rearward movement of said mower.

9. A mower including, in combination, a frame, cutting mechanism pivotally connected to said frame, adjusting mechanism for said cutting mechanism and power actuated reversible means for raising said cutting mechanism by either a forward or rearward movement of said mower.

10. A mower including, in combination, a frame, cutting mechanism pivotally connected to said frame, adjusting mechanism for said cutting mechanism, and power actuated reversible means for lowering said cutting mechanism by either a forward or rearward movement of said mower.

11. A mower including, in combination, a frame, cutting mechanism pivotally connected to said frame, adjusting mechanism for said cutting mechanism, and power actuated reversible means for raising and lowering said cutting mechanism by either a forward or rearward movement of said mower.

12. A mower, traction wheels, a frame mounted on said traction wheels, cutting mechanism pivotally connected to said frame, adjusting mechanism for said cutting mechanism, and a rack and pinion positioned between said adjusting mechanism and said traction wheels for adjusting said cutting mechanism.

13. A mower, traction wheels, a frame mounted on said traction wheels, a driving member fixed to one side of said driving wheels, cutting mechanism pivotally connected to said frame, adusting mechanism for said cutting mechanism, a reversible rack adapted to engage said driving member and connected to said adjusting mechanism, and means for normally holding said rack and driving member out of engagement with each other.

14. A mower, traction wheels, a frame mounted on said traction wheels, a driving member fixed to one of said traction wheels, a cutting mechanism pivotally connected to said frame, adjusting mechanism for said cutting mechanism, and a reversible rack adapted to engage said driving member and connected to said adjusting mechanism for adjusting said cutting mechanism.

15. A mower, including in combination, a frame, cutting mechanism pivoted to said frame, adjusting mechanism for said cutting mechanism, a reciprocable rack member movable in a substantially vertical plane and connected to said adjusting mechanism, and means disposed in the path of said rack member for moving said member in said plane.

16. A mower, including in combination, a frame, cutting mechanism pivoted to said frame, adjusting mechanism for said cutting mechanism, a reciprocable rack member movable in a substantially vertical plane and connected to said adjusting mechanism, and oppositely disposed means for guiding said rack with respect to said frame.

17. A mower, traction wheels, a frame mounted on said traction wheels, a driving member fixed to one of said traction wheels, a cutting mechanism pivoted to said frame, adjusting mechanism for said cutting mechanism, a reciprocable rack member movable in a substantially vertical plane and connected to said adjusting mechanism and oppositely disposed means for normally holding said rack member and said driving member disengaged.

18. A mower, traction wheels, a frame mounted on said traction wheels, a driving member fixed to one of said traction wheels, a cutting mechanism pivoted to said frame, adjusting mechanism for said cutting mechanism, a reciprocable rack member movable in a substantially vertical plane and connected to said adjusting mechanism and oppositely disposed crank members for normally holding said rack member and said driving member disengaged.

19. A mower, traction wheels, a frame mounted on said traction wheels, a driving member fixed to one of said traction wheels, a cutting mechanism pivoted to said frame, adjusting mechanism for said cutting mechanism, a reciprocable rack member movable in a substantially vertical plane and connected to said adjusting mechanism and oppositely disposed yielding means for guiding said rack member.

20. A mower, traction wheels, a frame mounted on said traction wheels, a driving member fixed to one of said traction wheels, cutting mechanism pivoted to said frame, adjusting mechanism for said cutting mechanism, an oscillatory supporting member mounted on said frame, a reciprocable rack member, and oppositely disposed means pivoted to said supporting member for guiding said rack member.

21. A mower, traction wheels, a frame mounted on said traction wheels, a driving member fixed to one of said traction wheels, cutting mechanism pivoted to said frame, adjusting mechanism for said cutting mechanism, an oscillatory supporting member mounted on said frame, a reciprocable rack member movable in a substantially vertical plane, and oppositely disposed means pivoted to said supporting member for guiding said rack member.

22. A mower, traction wheels, a frame mounted on said traction wheels, a driving member fixed to one of said traction wheels, cutting mechanism, a manually controlled oscillatory supporting member mounted on said frame, a reciprocable rack member movable in a substantially vertical plane, and oppositely disposed means pivoted to said supporting member for guiding said rack member.

23. A mower, including in combination, a frame, cutting mechanism pivotally connected to said frame, adjusting mechanism for said cutting mechanism, power actuated means including a reciprocable rack member connected to said adjusting mechanism, and a driving member adapted to engage said rack member for actuating said adjusting mechanism.

24. A mower, including in combination, a frame, cutting mechanism pivotally connected to said frame, adjusting mechanism for said cutting mechanism, a driving element mounted on said frame, power actuated mechanism for raising said cutting mechanism, means for connecting said power actuated mechanism with said driving element, and means for automatically disconnecting said last named mechanism from said element when said adjusting mechanism has been raised or lowered to a predetermined position by the forward movement of said mower.

25. A mower, including in combination, a frame, cutting mechanism pivotally connected to said frame, a driving element mounted on said frame, power actuated reversible mechanism for raising said cutting mechanism by the rearward movement of said mower, means for connecting said power actuated mechanism with said driving element, and means for automatically disconnecting said last named mechanism and said element.

26. A mower, including in combination, a frame, cutting mechanism pivotally connected to said frame, adjusting mechanism for said cutting mechanism, a driving element mounted on said frame, power actuated mechanism for raising said cutting mechanism by the rearward movement of said mower, means for connecting said power actuating mechanism with said driving element, and means for automatically disengaging said last named mechanism and said element in predetermined positions of adjustment of said cutting mechanism.

27. A mower, including in combination, a frame, a cutting mechanism pivotally connected to said frame, a spring for counterbalancing the weight of said cutting mechanism, and power actuated means for overcoming the tension of said spring on said cutting mechanism.

28. A mower, including in combination, a frame, cutting mechanism pivotally connected to said frame, adjusting mechanism for said cutting mechanism, and power actuated means for raising the cutting mechanism from a cutting position to a predetermined position and returning it to the identical cutting position.

29. A mower, including in combination, a frame, cutting mechanism pivotally connected to said frame, adjusting mechanism for said cutting mechanism, and power actuated means for raising the cutting mechanism from a cutting position to a predetermined position by a rearward movement of said mower and returning it to the identical cutting position by a forward movement of said mower.

30. A mower, including in combination, a frame, a cutting mechanism pivotally connected to said frame, adjusting mechanism for said cutting mechanism, means for adjusting and locking said cutting mechanism in predetermined positions of adjustment, and power actuated means for unlocking and lowering said cutting mechanism.

31. A mower, including in combination, a frame, a cutting mechanism pivotally connected to said frame, adjusting mechanism for said cutting mechanism, means for adjusting and locking said cutting mechanism in predetermined positions of adjustment, and manually controlled power actuated means for unlocking and lowering said cutting mechanism.

32. A mower, including in combination, a frame, a cutting mechanism pivotally connected to said frame, adjusting mechanism for said cutting mechanism, means for adjusting and locking said cutting mechanism in predetermined positions of adjustment, and manually controlled reversible power actuated means for unlocking and lowering said cutting mechanism.

33. A mower, including in combination, a frame, a cutting mechanism pivotally connected to said frame, an arm pivotally mounted on said frame and connected to said cutting mechanism, a lever pivotally mounted on said arm carrying means for locking said cutting mechanism in predetermined positions of adjustment, and power actuated means connected to said lever for unlocking and lowering said cutting mechanism.

In testimony whereof I affix my signature.

CHARLES PEARSON.